United States Patent
Omura et al.

(10) Patent No.: US 9,202,502 B2
(45) Date of Patent: Dec. 1, 2015

(54) MAGNETIC PARTICLES AND METHOD OF MANUFACTURING THE SAME, AND USAGE THEREOF

(71) Applicant: FUJIFILM Corporation, Minato-ku, Tokyo (JP)

(72) Inventors: Kazufumi Omura, Minami-ashigara (JP); Masahiko Mori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 13/727,140

(22) Filed: Dec. 26, 2012

(65) Prior Publication Data

US 2013/0164563 A1  Jun. 27, 2013

(30) Foreign Application Priority Data

Dec. 27, 2011 (JP) ................................. 2011-284624
Dec. 26, 2012 (JP) ................................. 2012-282687

(51) Int. Cl.
| | | |
|---|---|---|
| *G11B 5/712* | (2006.01) | |
| *G11B 5/706* | (2006.01) | |
| *G11B 5/64* | (2006.01) | |
| *G11B 5/65* | (2006.01) | |
| *H01F 1/11* | (2006.01) | |

(52) U.S. Cl.
CPC .............. *G11B 5/70626* (2013.01); *G11B 5/64* (2013.01); *G11B 5/65* (2013.01); *G11B 5/712* (2013.01); *H01F 1/11* (2013.01)

(58) Field of Classification Search
CPC .................................. G11B 5/712; H01F 1/11
USPC .............................. 252/62.56, 62.62, 62.51 R
See application file for complete search history.

(56) References Cited

U.S. PATENT DOCUMENTS

| 4,197,347 A | * | 4/1980 | Ogawa et al. .................. 428/328 |
| 6,677,036 B2 | | 1/2004 | Noguchi et al. |
| 2003/0143323 A1 | | 7/2003 | Noguchi et al. |
| 2009/0085002 A1 | * | 4/2009 | Omura et al. .......... 252/62.51 R |
| 2009/0087684 A1 | * | 4/2009 | Omura et al. .................. 428/800 |

FOREIGN PATENT DOCUMENTS

| JP | 01-232530 A | 9/1989 |
| JP | 2003-132531 A | 5/2003 |
| JP | 2009-088293 A | 4/2009 |

OTHER PUBLICATIONS

Office Action dated Nov. 18, 2014 in Japanese Application No. 2012-282687.
Office Action dated Feb. 25, 2014 in Japanese Application No. 2012-282687.

* cited by examiner

*Primary Examiner* — Carol M Koslow
(74) *Attorney, Agent, or Firm* — Sughrue Mion, PLLC

(57) ABSTRACT

An aspect of the present invention relates to a method of manufacturing magnetic particles, which comprises adding a carboxylic acid compound to a water-based magnetic liquid, wherein the water-based magnetic liquid comprises magnetic particles dispersed in an acidic water-based solvent, and the carboxylic acid compound is selected from the group consisting of aromatic compounds and aliphatic compounds having one or more carboxylic acid (salt) groups denoted by:

—COOM wherein M denotes a hydrogen atom or an alkali metal atom, when the number of the carboxylic acid (salt) group contained within the molecule thereof is 1, the number of carbon atoms, excluding the carboxylic acid (salt) group portion, ranges from 1 to 13; and then collecting the magnetic particles from the water-based magnetic liquid to obtain the magnetic particles the surfaces of which have been modified by being coated with the carboxylic acid compound.

18 Claims, No Drawings

MAGNETIC PARTICLES AND METHOD OF MANUFACTURING THE SAME, AND USAGE THEREOF

CROSS-REFERENCE TO RELATED APPLICATIONS

This application claims the benefit of priority under 35 USC 119 to Japanese Patent Application No. 2011-284624 filed on Dec. 27, 2011 and Japanese Patent Application No. 2012-282687 filed on Dec. 26, 2012, which are expressly incorporated herein by reference in their entirety.

BACKGROUND OF THE INVENTION

1. Field of the Invention

The present invention relates to magnetic particles, a method of manufacturing the same, and the usage thereof. More specifically, the present invention relates to magnetic particles modified so as to enhance dispersion in an organic solvent-based magnetic coating liquid, a method of manufacturing the same, and the usage thereof.

2. Discussion of the Background

In recent years, the means of rapidly transmitting information have undergone considerable development, permitting the transmission of data and images containing immense amounts of information. With this improvement in data transmission technology has come the demand for higher density recording in recording media and recording and reproduction devices for recording, reproducing, and storing information. The high dispersion of microparticulate magnetic material and increased smoothing of the surface of the magnetic layer to reduce spacing loss are known to be effective ways of achieving good electromagnetic characteristics in the high-density recording region.

Widely employed methods of enhancing the dispersion of magnetic powders include, for example, the method of incorporating a polar group such as a $SO_3Na$ group into a binder that is described in Japanese Unexamined Patent Publication (KOKAI) No. 2003-132531 or English language family members US2003/143323 A1 and U.S. Pat. No. 6,677,036, which are expressly incorporated herein by reference in their entirety, and the method of using a dispersing agent as an additive during the manufacturing of a magnetic layer-forming coating liquid as described in Japanese Unexamined Patent Publication (KOKAI) Heisei No. 1-232530, which is expressly incorporated herein by reference in its entirety.

As described in Japanese Unexamined Patent Publication (KOKAI) No. 2003-132531, incorporating polar groups into a binder is an effective means of enhancing dispersion. Conversely, when the number of polar groups introduced into the binder is excessive, dispersion may decrease. Additionally, dispersing agents such as those described in Japanese Unexamined Patent Publication (KOKAI) Heisei No. 1-232530 adsorb to the surface of magnetic particles and enhance compatibility between the magnetic particles, binder, and solvent, thereby improving dispersion of the magnetic particles in the magnetic layer-forming coating liquid. However, even when a microparticulate magnetic material of small primary particle diameter is employed, the microparticles of the magnetic material aggregate strongly, and end up being added to the magnetic layer-forming coating liquid as a coarse aggregate. Unless a powerful dispersion load is applied to break down the aggregated state of the magnetic material, the dispersing agent does nothing but cover the surface of the aggregate. As a result, the magnetic material ends up being present in the form of a coarse aggregate in the magnetic layer that is formed, precluding the achievement of good surface smoothness. It would also be conceivable to intensify the dispersing conditions to break down the aggregate formed by the powerful aggregation of microparticles of magnetic material. However, when that is done, dispersion process takes a long time, as well as abrasion of the dispersion medium causes foreign matter to mix into the medium and damages the magnetic material, undesirably presenting the possibility of compromising magnetic characteristics.

SUMMARY OF THE INVENTION

An aspect of the present invention provides for means for readily forming a magnetic layer in which magnetic particles are present in a highly dispersed state.

In manufacturing particulate magnetic recording media, organic solvents are mainly employed as a solvent in a coating liquid for forming a magnetic layer. In contrast, the present inventors conducted extensive research, noting that magnetic particles develop a positive surface charge in acidic water-based solvents because protons adsorb onto the magnetic particles. Thus, the repulsive force between positive charges enables the existence of a high state of dispersion. Accordingly, were it possible to cause a compound capable of functioning as a dispersing agent in an organic solvent-based coating liquid to adsorb to the surface (i.e., to modify the surface) of the magnetic particles in the acidic water-based solvent prior to the preparation of the coating liquid, it would conceivably be possible to cover the surface of the magnetic particles in a state, not of a coarse aggregate, but of microparticulate magnetic material. Accordingly, by employing the magnetic particles thus prepared, it is possible to obtain a coating material for forming a magnetic layer that is capable of forming a magnetic layer in which a microparticulate magnetic material is dispersed to a high degree.

The present inventors conducted further extensive research to devise the present invention.

An aspect of the present invention relates to a method of manufacturing magnetic particles, which comprises:

adding a carboxylic acid compound to a water-based magnetic liquid, wherein the water-based magnetic liquid comprises magnetic particles dispersed in an acidic water-based solvent, and the carboxylic acid compound is selected from the group consisting of aromatic compounds and aliphatic compounds having one or more carboxylic acid (salt) groups denoted by:

—COOM wherein M denotes a hydrogen atom or an alkali metal atom, when the number of the carboxylic acid (salt) group contained within the molecule thereof is 1, the number of carbon atoms, excluding the carboxylic acid (salt) group portion, is equal to or more than 1 but equal to or less than 13; and then collecting the magnetic particles from the water-based magnetic liquid to obtain the magnetic particles the surfaces of which have been modified by being coated with the carboxylic acid compound.

In an embodiment, the carboxylic acid compound comprises one or more branched alkyl groups and/or fluorine-containing substituents selected from the group consisting of fluorine atoms and alkyl groups substituted with one or more fluorine atoms.

In an embodiment, the carboxylic acid compound is an aromatic compound comprising one or more substituents selected from the group consisting of the branched alkyl groups and the fluorine-containing substituents.

In an embodiment, the aromatic compound comprises one or more benzene rings on which one or more substituents selected from the group consisting of the branched alkyl groups and the fluorine-containing substituents are substituted at an ortho position or a meta position of the carboxylic acid (salt) group.

In an embodiment, the carboxylic acid compound is a monosubstituted nitrogen, disubstituted nitrogen, or trisubstituted nitrogen-containing compound.

In an embodiment, the carboxylic acid compound comprises one or more hydroxyl groups.

In an embodiment, the carboxylic acid compound comprises two or more of the carboxylic acid (salt) groups.

In an embodiment, the carboxylic acid compound is selected from the group consisting of aconitic acid, aspartic acid, DL-alanine, benzoic acid, phthalic acid, cinnamic acid, difluorobenzoic acid, trifluoromethyl benzoic acid, hydroxyisobutyric acid, fluorobenzoic acid, benzoylbenzoic acid, phenylvaleric acid, bishydroxyethyl glycine, DL-mandelic acid, N-(4-hydroxyphenyl)glycine, N-acetylglycine, citric acid, sodium gluconate, crotonic acid, succinic acid, salicylic acid, cyclohexanecarboxylic acid, tartaric acid, trimellitic acid, phenylalanine, and tert-butylisophthalic acid.

In an embodiment, the magnetic particles are hexagonal ferrite magnetic particles.

A further aspect of the present invention relates to magnetic particles manufactured by the above manufacturing method.

In an embodiment, the magnetic particles are employed as magnetic recording magnetic powder.

A still further aspect of the present invention relates to a magnetic coating material which comprises the above magnetic particles and an organic solvent.

In an embodiment, the magnetic coating material further comprises a binder.

A still further aspect of the present invention relates to a coating material which is the above magnetic coating material and employed in forming a magnetic layer of a magnetic recording medium.

A still further aspect of the present invention relates to a method of manufacturing a magnetic recording medium, which comprises:

dispersing the above magnetic particles together with an organic solvent and a binder to prepare a magnetic coating material; and forming a magnetic layer with the magnetic coating material that has been prepared.

A still further aspect of the present invention relates to a magnetic recording medium manufactured by the above manufacturing method.

The present invention can provide a magnetic recording medium in which microparticulate magnetic material is dispersed to a high degree, affording good electromagnetic characteristics.

Further, since dispersion of the microparticulate magnetic material is facilitated, the dispersion load on the magnetic particles in the manufacturing process can be greatly reduced.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a method of manufacturing surface-modified magnetic particles.

In the method of manufacturing surface-modified magnetic particles of an aspect of the present invention, a carboxylic acid compound (referred to as a "surface-modifying agent", hereinafter), which is selected from the group consisting of aromatic compounds and aliphatic compounds having one or more carboxylic acid (salt) groups denoted by:

—COOM wherein M denotes a hydrogen atom or an alkali metal atom, when the number of the carboxylic acid (salt) group contained within the molecule thereof is 1, the number of carbon atoms, excluding the carboxylic acid (salt) group portion, is equal to or more than 1 but equal to or less than 13, is added to a water-based magnetic liquid wherein magnetic particles are dispersed in an acidic water-based solvent, after which magnetic particles are collected from the water-based magnetic liquid to obtain magnetic particles the surfaces of which have been modified by being coated with the compound.

The present invention further provides magnetic particles obtained by the above manufacturing method. The above magnetic particles can disperse to a high degree in a coating liquid for forming a magnetic layer of a magnetic recording medium, and are suited as magnetic recording magnetic powder.

The presence of magnetic particles in a microparticulate state in the magnetic layer of a magnetic recording medium can enhance electromagnetic characteristics. Accordingly, it is desirable to incorporate microparticulate magnetic particles in a highly dispersed state in the magnetic layer to enhance electromagnetic characteristics. To that end, it is preferable to disperse microparticulate magnetic material to a high degree in the magnetic layer-forming coating liquid.

Here, the surface-modifying agent described in detail below is adhered to the surface of the magnetic particles that are obtained by the manufacturing method of an aspect of the present invention to modify the surface thereof. Such surface modification allows the presence of the magnetic particles in a highly dispersed state in an organic solvent-based magnetic coating material. That is, an aspect of the present invention makes it possible to obtain magnetic particles permitting the formation of a magnetic layer in which microparticulate magnetic material is highly dispersed. As will be indicated in Examples further below, whether or not dispersibility has been improved by the surface-modifying treatment described below can be determined by the fact that the surface of the magnetic particles has been modified by adhering the surface-modifying agent to the surface of the magnetic particles. When the dispersion conditions are intensified in an effort to increase dispersion, a phenomenon whereby the dispersed particles reaggregate (referred to as "overdispersion") is known to occur. However, the above surface-modifying agent can modify the surface of the magnetic particles, thereby inhibiting the occurrence of overdispersion.

The method of manufacturing magnetic particles of an aspect of the present invention will be described in greater detail below.

Preparation of Water-Based Magnetic Liquid

The above "water-based magnetic liquid" refers to a liquid in which magnetic particles are in a state of dispersion, without precipitation or aggregation, to a degree where separation of the solid phase and liquid phase cannot be determined visually. One embodiment (referred to as the "first embodiment", hereinafter), can be obtained by simultaneously or sequentially admixing the water-based solvent, magnetic particles (also referred to as the "starting material magnetic particles", hereinafter), and an acid component. From the perspective of suitability to the formation of a high-density recording-use magnetic recording medium, the starting material magnetic particles desirably have an average primary particle size of equal to or less than 35 nm.

In this context, the average primary particle size of the magnetic particles is a value measured by the following method.

The magnetic particles are photographed at 100,000-fold magnification with a model H-9000 transmission electron microscope made by Hitachi and printed on photographic paper at an overall magnification of 500,000-fold to obtain a particle photograph. The targeted magnetic particles are selected in the particle photograph, the contours of the particles are traced with a digitizer, and the particle size is measured with KS-400 Carl Zeiss image analysis software. The size of 500 primary particles is measured. The term "primary particle" refers to an independent particle that has not aggregated. The arithmetic average of the particle size as measured by this method is adopted as the average primary particle size of the magnetic particles.

From the perspective of achieving stable magnetization without thermal fluctuation, the average primary particle size is desirably equal to or more than 10 nm. From the perspective of achieving both stable magnetization and high density recording, the average primary particle size desirably falls within a range of 10 to 35 nm, preferably within a range of 20 to 35 nm. However, even when the starting material magnetic particles are microparticles, when they are present in the magnetic layer as aggregates, each aggregate behaves like a coarse particle, making it difficult to improve the electromagnetic characteristics. Accordingly, to form a magnetic layer in which the magnetic particles are dispersed to a high degree in the present invention, the surface of the magnetic particles is subjected to a modifying treatment (surface-modifying treatment) with a surface-modifying agent in a water-based solvent as set forth further below. This treatment is described further below.

In the present invention, the size of the particles or powder of magnetic particles or the like (referred to as the "particle size", hereinafter), (1) is given by the length of the major axis of the particle, that is, the major axis length when the particles are acicular, spindle-shaped, cylindrical in shape (with the height being greater than the maximum major diameter of the bottom surface), or the like; (2) is given by the maximum major diameter of the plate surface or bottom surface when the particles are tabular or cylindrical in shape (with the thickness or height being smaller than the maximum major diameter of the plate surface or bottom surface); and (3) is given by the diameter of a circle of equal perimeter when the particles are spherical, polyhedral, or of indeterminate shape, and the major axis of the particle cannot be specified based on the shape. The term "diameter of a circle of equal perimeter" can be obtained by circular projection.

The average particle size of the particles is the arithmetic average of the above particle size and is obtained by measuring 500 primary particles, as set forth above.

Examples of starting material magnetic particles that can be employed in the first embodiment are the various ferromagnetic particles that are generally employed in the magnetic layer of a magnetic recording medium, such as hexagonal ferrite magnetic particles and ferromagnetic metal magnetic particles.

Examples of the water-based solvent are solvents comprising water as principal component, including water and mixed solvents of water and a water-soluble organic solvent such as methanol, ethanol, acetone, N,N-dimethylformamide, N,N-dimethylacetamide, and tetrahydrofuran.

The acid component can be either an organic or inorganic acid. Examples of inorganic acids that can be employed are hydrochloric acid and nitric acid. Examples of organic acids are formic acid and acetic acid. Of these, the use of acetic acid is desirable from the perspective of ease of handling, and the use of hydrochloric acid, a strong acid, is desirable from the perspective of being able to adjust the pH with just a small quantity. The magnetic particles can be dispersed to a high degree in the water-based magnetic liquid by imparting an adequate positive charge to the surface of the magnetic particles. From this perspective, the quantity of acid employed is desirably one that is adequate to adjust the water-based magnetic liquid to equal to or lower than pH 5, and preferably one that is adequate to adjust it to equal to or lower than pH 4. Since there are cases where the surface of the magnetic particles will dissolve under strongly acidic conditions, the above pH is desirably equal to or higher than 3.

The water-based magnetic liquid can be obtained by simultaneously or sequentially admixing, and desirably stirring, a water-based solvent, starting material magnetic particles, and an acid component. To enhance the magnetic characteristics of the magnetic particles, the step of dispersing the magnetic particles in the acidic water-based solvent (the dispersion treatment in the acidic water-based solvent and the recovery of the solid component by solid-liquid separation) is desirably conducted multiple times. The acid treatment is for removing foreign matter that compromises magnetic characteristics from the surface of the particles. This point will be described in greater detail. For example, there are cases where a glass component will remain when not completely removed by the acid treatment from hexagonal ferrite magnetic particles obtained by the glass crystallization method set forth further below. Such a residual glass component will some-times compromise the magnetic characteristics of the magnetic particles. Repeatedly conducting dispersion in an acidic water-based solvent will dissolve and remove glass components from the surface of the particles. In an aqueous slurry containing charged particles, the concentration of the electrolyte (ion concentration) is known to affect the dispersion/aggregation state. When the electrolyte concentration is low, the electric double layer around the charged particles widens, a counter force is exerted to prevent stacking of the electric double layer, and the charged particles tend to disperse without precipitating. Conversely, when a large quantity of an ionic component is present in the aqueous slurry, the ionic balance within the system collapses, dispersion stabilization due to the electric double layer is impeded, and the magnetic particles precipitate relatively quickly. Accordingly, the more foreign matter that has dissolved and ionized due to the dispersion treatment in the acidic water-based solvent, the greater the ionic component that will be present in the system, thereby reducing the dispersion stability of the magnetic particles. The smaller the quantity of foreign matter becomes, the more stable the dispersion of the magnetic particles and the less they tend to precipitate. From this perspective, it is desirable to repeat the dispersion treatment in the acidic water-based solvent a number of times that is adequate to ensure that the magnetic particles do not tend to precipitate. This can be done as a countermeasure to remove foreign matter from the surface of the magnetic particles and to enhance the magnetic characteristics of the magnetic particles. It is also desirable to repeat the dispersion treatment in the acidic water-based solvent to cause the surface-modifying agent to cover the surface of the magnetic particles that have been dispersed to a high degree.

On the other hand, a glass crystallization method is a method of manufacturing hexagonal ferrite magnetic particles widely employed as the magnetic powder for magnetic recording media. In general, the glass crystallization method comprises the steps of (1) melting a starting material mixture containing glass-forming components and hexagonal ferrite-forming components, (2) rapidly cooling and solidification, (3) heat treating the solidified product (causing hexagonal ferrite crystals to precipitate), (4) treating the solidified product with an acid (to remove the glass component by dissolution), and (5) cleaning with a water-based solvent. In step (4), a water-based magnetic liquid necessarily containing magnetic particles (hexagonal ferrite magnetic particles) is obtained because step (4) is generally conducted in an acidic water-based solvent. The water-based magnetic liquid that is obtained will normally be in a dispersed state from which hexagonal ferrite magnetic particles do not precipitate. In an embodiment of the present invention, the dispersed state can be utilized to conduct a surface-modifying treatment, described further below, on the water-based magnetic liquid obtained in acid treatment step (4). That is, an aspect of the present invention also includes an embodiment (also referred to as "the second embodiment", hereinafter) in which the water-based magnetic liquid is obtained during the process for obtaining hexagonal ferrite magnetic particles by the glass crystallization method, specifically, during the acid treatment step in the glass crystallization method. The known glass crystallization techniques described in Japanese Unexamined Patent Publication (KOKAI) Nos. 2010-282671, 2010-235411, 2010-080608, which are expressly incorporated herein by reference in their entirety, and the like can be applied to the above step of the glass crystallization method in the second embodiment.

Surface-Modifying Treatment

In an aspect of the present invention, the surface-modifying agent described below is added to the water-based magnetic liquid obtained in the above-described first embodiment or second embodiment. In the water-based magnetic liquid, magnetic particles can disperse to a high degree due to repulsive force between positive charges, as set forth above. Thus, it becomes possible to cover the surface (modify the surface) of the magnetic particles in the form of microparticulate magnetic material, and not a coarse aggregate. There may be cases where aggregation of the magnetic particles is observed due to decreased repulsive force between positive charges of the magnetic particles when the surfaces of the magnetic particles are covered by the surface-modifying agent. However, the aggregate can be readily broken down in an organic solvent because, on the surfaces of the magnetic particles, the surface-modifying agent that can achieve improvement of dispersibility in an organic solvent is adhered.

The compound employed as the surface-modifying agent in an aspect of the present invention is a carboxylic acid compound selected from the group consisting of aromatic compounds and aliphatic compounds having one or more carboxylic acid (salt) groups denoted by:

wherein M denotes a hydrogen atom or an alkali metal atom. However, in compounds where the number of carboxylic acid (salt) groups contained within the molecule thereof is 1, it is difficult to enhance dispersion when the number of carbon atoms of the portion excluding the carboxylic acid (salt) group is greater than 13. Accordingly, as the compound containing only one carboxylic acid (salt) group within the molecule thereof, those comprising equal to or more than 1 but equal to or less than 13 carbon atoms in the portion excluding the carboxylic acid (salt) group are employed.

The above compound makes it possible to enhance the dispersion of the magnetic particles in an organic solvent or in an organic solvent containing a binder (that is, in a coating liquid for forming a magnetic recording medium). The present inventors have presumed the reason for this to be that incorporating an adsorbing functional group in the form of the carboxylic acid (salt) group causes it to adsorb to the surface of the magnetic powder, modifying the surface of the magnetic particles so that they tend to be readily wetted by and spread throughout the organic solvent and/or binder.

The above compound will be described in greater detail below.

The aromatic ring contained in the aromatic compound having the carboxylic acid (salt) group can be an aromatic hydrocarbon ring, an aromatic hetero ring, or a fused ring. From the perspective of availability, an aromatic hydrocarbon ring is desirable. Examples of the aromatic ring contained in the aromatic compound are benzene and naphthalene rings. Of these, a benzene ring is desirable. It is also possible for two or more aromatic rings to be joined through a divalent linking group. The carboxylic acid (salt) group can be directly substituted onto the aromatic ring, or substituted through a linking group such as an alkylene group or alkenylene group.

The aliphatic compound having the above carboxylic acid (salt) group can be a cyclic or acyclic aliphatic compound. Examples of aliphatic groups are saturated and unsaturated alkyl, alkylene, and cycloalkylene groups. The number of carbon atoms in the aliphatic group is desirably 1 to 10, preferably 1 to 6. The aliphatic compound is also desirably a nitrogen-containing compound. The nitrogen contained in the nitrogen-containing compound can be in the form of monosubstituted nitrogen, where one of the three bonds of the nitrogen atom is substituted with a substituent other than a hydrogen atom, that is, nitrogen is incorporated as an unsubstituted amino group (—NH$_2$); disubstituted nitrogen, where two of the three bonds of the nitrogen atom are substituted; or trisubstituted nitrogen, where all three bonds are substituted. From the perspective of further enhancing dispersion, the use of a disubstituted or trisubstituted nitrogen-containing compound is desirable.

As set forth above, among the carboxylic acid compounds, in a compound in which the number of carboxylic acid (salt) groups contained within the molecule is one, the number of carbon atoms in the portion excluding the carboxylic acid (salt) group is equal to or more than 1 but equal to or less than 13. In compounds in which the number of carboxylic acid (salt) groups within the molecule is equal to or more than 2, the number of carbon atoms in the portion excluding the carboxylic acid (salt) group can be equal to or more than 1 but equal to or less than 13, or can exceed 13.

The carboxylic acid compound can contain one or more substituents other than the carboxylic acid (salt) group. Specific examples of such substituents are alkyl groups (such as alkyl groups having 1 to 6 carbon atoms), hydroxyl groups, alkoxyl groups (such as alkoxyl groups having 1 to 6 carbon atoms), halogen atoms (such as fluorine atoms, iodine atoms, and bromine atoms), cyano groups, amino groups, nitro groups, and acyl groups. Hereinafter, unless specifically stated otherwise, the term "substituent" in the present invention shall refer to the substituents described above.

Examples of desirable substituents among the above are branched alkyl groups and fluorine-containing substituents selected from the group consisting of fluorine atoms and alkyl groups substituted with one or more fluorine atoms, such as trifluoromethyl groups. Of these, good dispersion-enhancing effects can be achieved with an aromatic compound containing, along with the carboxylic acid (salt) group, one or more substituents selected from the group consisting of branched alkyl groups and the fluorine-containing substituents. When the aromatic compound contains an aromatic ring in the form of a benzene ring, the fluorine-containing substituent and branched alkyl group can be substituted at any position, such as the ortho position, meta position, or para position of the carboxylic acid (salt) group. Substitution at the ortho or meta position is desirable from the perspective of further enhancing dispersion.

Further, compounds containing one or more hydroxyl group in addition to the carboxylic acid (salt) group are desirable as surface-modifying agents from the perspective of enhancing dispersion.

In the present invention, for a group having a substituent, the "number of carbon atoms" means the number of carbon atoms of the portion excluding the substituent. In the present invention, a range given as values separated by "to" is a range that includes the preceding and subsequent numeric values as the minimum and maximum values, respectively.

As set forth above, the surface-modifying agent modifies the surface by adhering to the surface of the magnetic particle by means of the carboxylic acid (salt) group contained. From the perspective of enhancing dispersion, a compound comprising two or more of these carboxylic acid (salt) groups is desirable as a surface-modifying agent. The greater the proportion of molecules accounted for by portions other than the carboxylic acid (salt) group, the smaller the number of molecules of surface-modifying agent that adhere to the surface of the magnetic particle. Thus, from the perspective of achieving a good surface-modifying effect, the proportion accounted for by portions other than the carboxylic acid (salt) group is desirably not large. From this perspective, in the surface-modifying agent, the molecular weight of portions other than the carboxylic acid (salt) group is desirably equal to or less than 400. By way of example, it is about equal to or less than 200. From the perspective of the surface-modifying effect, it is desirable for the molecular weight of portions other than the carboxylic acid (salt) group to be equal to or more than 20.

All of the surface-modifying agents set forth above can be synthesized by known methods and are available as commercial products. The quantity of surface-modifying agent that is added to the water-based magnetic liquid obtained by dispersing magnetic particles in an acidic water-based solvent is desirably 0.1 to 10 weight parts per 100 weight parts of magnetic particles and 0.0001 to 5 weight parts per 100 weight parts of the total quantity of water-based magnetic liquid to obtain magnetic particles readily capable of dispersing in a highly dispersed state in an organic solvent. A single surface-modifying agent can be employed, or two or more can be combined for use. Stirring is desirably conducted in the course of adding the surface-modifying agent to the water-based magnetic liquid and/or following the addition to cause the surface-modifying agent to uniformly adhere to the surface of the magnetic particles. The surface-modifying agent can be added to the water-based magnetic liquid as is, or in the form of a solution prepared by adding the surface-modifying agent to a water-based solvent. When the surface-modifying agent is added in the form of a solution, the concentration of the surface-modifying agent in the solution is not specifically limited. The solution can optionally contain an alkali metal salt to convert a portion or all of the surface-modifying agents in which M denotes a hydrogen atom into surface-modifying agents in which M denote an alkali metal atom. Alternatively, the solution can optionally contain an acid component to convert a portion or all of the surface-modifying agents in which M denotes an alkali metal atom into surface-modifying agents in which M denote a hydrogen atom.

The surface of the magnetic particle can be coated with the surface modifying-agent by adding the surface-modifying agent and optionally conducting stifling. When magnetic particles aggregate and precipitate by being surface-modified in this manner, the supernatant can be removed and the surface-modified magnetic particles can be collected from the water-based solvent. When the magnetic particles are collected as an aggregate, such aggregate can be readily broken down in an organic solvent. That is because, in the aggregate, the surfaces of the magnetic particles are coated with the surface-modifying agent. Accordingly, a highly dispersed state in an organic solvent-based magnetic coating material can be achieved without increasing the dispersion load. Alternatively, when the magnetic particles are dispersed in the water-based magnetic liquid after the surface-modifying treatment, the magnetic particles the surfaces of which have been modified can be collected by a known solid-liquid separation method such as centrifugal separation, filtration, and the like. The magnetic particles that are collected can be washed by decantation or the like in an aqueous solution that has been, as needed, adjusted to a weakly acidic to neutral pH by adding a base, and then conducting a drying process to obtain dry powder. In the second embodiment, the step of obtaining magnetic particles after the surface-modifying treatment can be conducted in the same manner as the washing step in the usual glass crystallization method, or using a process based on it. In both the first and second embodiments, magnetic particles the surfaces of which have been modified can be obtained in this manner.

A further aspect of the present invention relates to a magnetic coating material comprising the magnetic particles of an aspect of the present invention and an organic solvent. As set forth above, in order to obtain a magnetic recording medium with good electromagnetic characteristics, it is desirable to achieve a highly dispersed state of magnetic particles in a coating liquid for forming a magnetic layer of a magnetic recording medium. In this context, the magnetic particles of an aspect of the present invention can disperse to a high degree in an organic solvent. Accordingly, the magnetic coating material of an aspect of the present invention can be suitably employed for forming a magnetic layer of a magnetic recording medium. The magnetic coating material can contain a binder (resin component) together with the magnetic particles and an organic solvent. Details thereof will be described further below.

The method of manufacturing a magnetic recording medium of an aspect of the present invention will be described below.

The method of manufacturing a magnetic recording medium of an aspect of the present invention comprises dispersing the magnetic particles of an aspect of the present invention together with an organic solvent and a binder to prepare a magnetic coating material; and forming a magnetic layer with the magnetic coating material that has been prepared.

A further aspect of the present invention relates to a magnetic recording medium manufactured by the above method.

The method of manufacturing magnetic particles of an aspect of the present invention is conducted in a water-based solvent. When a magnetic coating material containing the water-based solvent is employed to form a magnetic layer, the magnetic layer that is formed would become hydrophilic. Thus, there is a concern of plasticization or the like due to moisture absorption. Accordingly, a magnetic coating material with an organic solvent system is employed to form the magnetic layer in the method of manufacturing a magnetic recording medium of an aspect of the present invention. In this context, the term "organic solvent" means a non-water-based organic solvent; trace amounts of moisture of a degree that does not cause problems such as plasticization in the magnetic coating material are permitted.

Examples of the organic solvent that is employed in the magnetic coating material are those organic solvents that are generally employed to prepare particulate magnetic recording media. Specific examples thereof are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane; these may be employed in any ratio. Among them, from the perspectives of the solubility of the binders that are commonly employed in magnetic recording media and adsorption of binder onto the surface of the magnetic particles, the use of an organic solvent containing a ketone (ketone-based organic solvent) is desirable.

These organic solvents need not be 100 percent pure and may contain impurities such as isomers, unreacted materials, by-products, decomposition products, oxides and moisture in addition to the main components. The content of these impurities is preferably equal to or less than 30 weight percent, more preferably equal to or less than 10 weight percent. To improve dispersion properties, a solvent having a somewhat strong polarity is desirable. It is desirable that solvents having a dielectric constant equal to or higher than 15 are comprised equal to or higher than 50 weight percent of the solvent composition. Further, the dissolution parameter is desirably 8 to 11.

The magnetic particles that are subjected to dispersion in the organic solvent have been surface-modified. If they are obtained as dried powder in the form of an aggregate, the aggregate can be broken down by the usual dispersion treatment that is conducted to form a magnetic layer to readily obtain a magnetic coating material containing highly dispersed magnetic particles without generating a high dispersion load.

Specific embodiments of the method of manufacturing a magnetic recording medium of an aspect of the present invention will be described below.

Magnetic Layer

The magnetic layer in an aspect of the present invention is a layer containing a binder and the magnetic particles that have been subjected to the surface-modifying treatment.

Examples of the binder for use in the magnetic coating material employed for the formation of magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs [0029] to [0031] in Japanese Unexamined Patent Publication (KOKAI) No. 2010-24113, which is expressly incorporated herein by reference in its entirety, for details of the binder. A polyisocyanate curing agent may also be employed with the above resins.

Additives can be added to the magnetic layer as needed. Examples of additives are abrasives, lubricants, dispersing agents, dispersion adjuvants, antifungal agents, antistatic agents, oxidation-inhibiting agents, and carbon black. Commercial products can be suitably selected for use based on the desired properties of the additives. Use of the surface-modifying agent set forth above as an additive is effective to further enhance dispersion. That is because dispersion can be further improved by causing the surface-modifying agent exhibiting a dispersion-enhancing effect to adhere to the magnetic particles that are highly dispersed in the organic solvent.

Nonmagnetic Layer

Details of the nonmagnetic layer will be described below. In an aspect of the present invention, a nonmagnetic layer comprising nonmagnetic powder and a binder can be formed between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs [0036] to [0039] in Japanese Unexamined Patent Publication (KOKAI) No. 2010-24113 for details thereof.

Binders, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto. Carbon black and organic powders can be added to the nonmagnetic layer. Reference can be made to paragraphs [0040] to [0042] in Japanese Unexamined Patent Publication (KOKAI) No. 2010-24113 for details thereof.

Nonmagnetic Support

The magnetic coating material that has been prepared by the above method is coated directly, or through another layer such as a nonmagnetic layer, on the nonmagnetic support. As a result, a magnetic recording medium having the magnetic layer on the nonmagnetic support, or as needed, through another layer such as a nonmagnetic layer can be obtained.

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in an aspect of the present invention desirably ranges from 3 to 10 nm.

Layer Structure

As for the thickness structure of the magnetic recording medium obtained by an aspect of the present invention, the thickness of the nonmagnetic support desirably ranges from 3 to 80 µm. The thickness of the magnetic layer can be optimized based on the saturation magnetization of the magnetic head employed, the length of the head gap, and the recording signal band, and is normally 10 to 150 nm, desirably 20 to 120 nm, and preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 µm, desirably 0.3 to 2.0 µm, and preferably, 0.5 to 1.5 µm in thickness. The nonmagnetic layer of the magnetic recording medium of an aspect of the present invention can exhibit its effect so long as it is substantially nonmagnetic. It can exhibit the effect of the present invention, and can be deemed to have essentially the same structure as the magnetic recording medium of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

Backcoat Layer

A backcoat layer can be provided on the surface of the nonmagnetic support opposite to the surface on which the magnetic layer is provided, in an aspect of the present invention. The backcoat layer desirably comprises carbon black and inorganic powder. The formula of the magnetic layer or nonmagnetic layer can be applied to the binder and various additives for the formation of the backcoat layer. The backcoat layer is preferably equal to or less than 0.9 µm, more preferably 0.1 to 0.7 µm, in thickness.

Manufacturing Process

With the exception that the surface-modified magnetic particles obtained by the method of manufacturing magnetic particles of an aspect of the present invention is employed, the coating liquid (magnetic coating material) for forming the magnetic layer is prepared by the same method as that used to prepare an ordinary magnetic layer coating liquid.

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in an aspect of the present invention, including the magnetic particle, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads and other beads may be employed to disperse the magnetic layer, nonmagnetic layer and backcoat layer coating liquids. Dispersing media with a high specific gravity such as zirconia beads, titania beads, and steel beads are suitable for use. The particle diameter and filling rate of these dispersing media can be optimized for use. A known dispersing device may be employed. Reference can be made to paragraphs [0051] to [0057] in Japanese Unexamined Patent Publication (KOKAI) No. 2010-24113 for details of the method of manufacturing a magnetic recording medium.

An aspect of the present invention can form a magnetic layer in which magnetic particles are highly dispersed. Thus, an aspect of the present invention can provide a high-density recording-use magnetic recording medium that exhibits good electromagnetic characteristics.

EXAMPLES

The present invention will be described in detail below based on examples. However, the present invention is not limited to the examples. The terms "parts" and "percent" given in Examples are weight parts and weight percent.

Preparation Example 1

To 1.0 part of the barium ferrite magnetic particles described below were added 3.0 parts of water, 0.24 part of a 30% acetic acid aqueous solution, and 13 parts of 0.1 mm φ zirconia beads (made by Nikkato). The mixture was then dispersed for 6 hours in a bead mill to prepare a water-based magnetic liquid in which barium ferrite particles were dispersed. Measurement revealed the diameter of the barium ferrite magnetic particles in the water-based magnetic liquid that had been prepared (dispersed particle diameter) to be 30 nm. The fact that it was possible to disperse barium ferrite magnetic particles in a state approaching the diameter of primary particles in an acidic aqueous solution was confirmed.

Barium Ferrite Magnetic Particles
Composition excluding oxygen (molar ratio): Ba/Fe/Co/Zn=1/9/0.2/1
Hc: 176 kA/m (approximately 2,200 Oe)
Average plate diameter (primary particle diameter): 25 nm
Average plate ratio: 3
Specific surface area by BET method: 65 m$^2$/g
σs: 49 A·m$^2$/kg (approximately 49 emu/g)
pH: 7

(Method of Measuring Dispersed Particle Diameter)

The water-based magnetic liquid obtained in Preparation Example 1 was diluted with water to a solid component concentration of 0.2%.

The average particle diameter in the diluted liquid as measured with an LB-500 dynamic light scattering particle size analyzer made by Horiba was adopted as the dispersed particle diameter.

Example 1

(1) Preparation of Surface-Modified Magnetic Particles

An aqueous solution comprised of a surface-modifying agent in the form of 0.24 part of trans-aconitic acid, 4.5 parts of water, and 0.05 part of sodium hydroxide was added to 42 parts of the water-based magnetic liquid prepared in Preparation Example 1 with stifling. The mixed aqueous solution obtained was centrifuged under conditions of 100,000 rpm×100 min (600,000 G) with a CS150GXL ultracentrifuge made by Himac to obtain solid 1.

Solid 1 was dried for 36 hours at 140° C. and pulverized in a mortar to obtain magnetic powder 1. The fact that the surface-modifying agent had adsorbed to magnetic powder 1 was confirmed by the method set forth further below.

(2) Preparation of Magnetic Coating Material 1.0 part of magnetic powder 1 obtained above was suspended in a solution comprised of 0.14 part of polyester polyurethane, 1.6 parts of methyl ethyl ketone (2-butanone), and 1.1 parts of cyclohexanone. Ten parts of 0.1 mm φ zirconia beads were added and the mixture was ultrasonically dispersed for 10 minutes, yielding magnetic coating material 1. Measurement by the method set forth below revealed the diameter of the barium ferrite magnetic particles in the magnetic coating material 1 that had been obtained (dispersed particle diameter) to be 49 nm. By extending the dispersion period, it was possible to further reduce the diameter of the dispersed particles.

(Method of Measuring Dispersed Particle Diameter)

Magnetic coating material 1 was diluted to a solid component concentration of 0.2% with a mixed liquid containing cyclohexanone and methyl ethyl ketone in a volumetric ratio of 6.0 cyclohexanone:9.0 methyl ethyl ketone (the solid component denoted the combined weight of the magnetic particles and the polyurethane resin).

The average particle diameter in the diluted liquid as measured with an LB-500 dynamic light scattering particle size analyzer made by Horiba was adopted as the dispersed particle diameter. The smaller the dispersed particle diameter, the better the dispersion without aggregation of magnetic particles that was indicated.

(Confirmation of Coverage by Surface-Modifying Agent)

A 5 mg quantity of magnetic powder 1 was weighed out. A differential thermal analyzer (TG/DT A6300 made by Seiko Instruments) was employed to raise the temperature from 30° C. to 500° C. at a rate of 10° C./minute. Since a reduction in weight was determined over the volatilization temperature range of 250° C. to 500° C. of the surface-modifying agent employed in the present Example, the surface-modifying agent was determined to have adsorbed to the surface of the magnetic particles.

Example 2

(1) Preparation of Surface-Modified Magnetic Particles

With the exception that the aqueous solution that was added to the water-based magnetic liquid prepared in Preparation Example 1 was changed to an aqueous solution comprised of 0.18 part of a surface-modifying agent in the form of aspartic acid, 3.4 parts of water, and 0.05 part of sodium hydroxide, magnetic powder 2 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 2 obtained above, a magnetic coating material 2 was prepared by the same method as in Example 1. Measurement by the same method as in Example 1 of the dispersed particle diameter in the magnetic coating material obtained revealed it to be 49 nm. When the dispersion period was extended from 10 minutes to 33 minutes, a dispersed particle diameter of 39 nm was obtained.

Example 3

(1) Preparation of Surface-Modified Magnetic Particles

With the exception that the aqueous solution that was added to the water-based magnetic liquid prepared in Preparation Example 1 was changed to an aqueous solution comprised of 0.12 part of a surface-modifying agent in the form of DL-alanine, 2.3 parts of water, and 0.05 part of sodium hydroxide, magnetic powder 3 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 3 obtained above, a magnetic coating material 3 was prepared by the same method as in Example 1. Measurement by the same method as in Example 1 of the dispersed particle diameter in the magnetic coating material obtained revealed it to be 45 nm. When the dispersion period was extended from 10 minutes to 20 minutes, a dispersed particle diameter of 42 nm was obtained.

Example 4

(1) Preparation of Surface-Modified Magnetic Particles

With the exception that the aqueous solution that was added to the water-based magnetic liquid prepared in Preparation Example 1 was changed to an aqueous solution comprised of 0.16 part of a surface-modifying agent in the form of benzoic acid, 3.1 parts of water, and 0.05 part of sodium hydroxide, magnetic powder 4 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 4 obtained above, a magnetic coating material 4 was prepared by the same method as in Example 1. Measurement by the same method as in Example 1 of the dispersed particle diameter in the magnetic coating material obtained revealed it to be 53 nm. When the dispersion period was extended to 18 minutes, a dispersed particle diameter of 40 nm was obtained.

Example 5

(1) Preparation of Surface-Modified Magnetic Particles

With the exception that the aqueous solution that was added to the water-based magnetic liquid prepared in Preparation Example 1 was changed to an aqueous solution comprised of 0.22 part of a surface-modifying agent in the form of isophthalic acid, 4.3 parts of water, and 0.05 part of sodium hydroxide, magnetic powder 5 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 5 obtained above, a magnetic coating material 5 was prepared by the same method as in Example 1. Measurement by the same method as in Example 1 of the dispersed particle diameter in the magnetic coating material obtained revealed it to be 50 nm. When the dispersion period was extended to 30 minutes, a dispersed particle diameter of 36 nm was obtained.

Example 6

(1) Preparation of Surface-Modified Magnetic Particles

With the exception that the aqueous solution that was added to the water-based magnetic liquid prepared in Preparation Example 1 was changed to an aqueous solution comprised of 0.20 part of a surface-modifying agent in the form of trans-cinnamic acid, 3.8 parts of water, and 0.05 part of sodium hydroxide, magnetic powder 6 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 6 obtained above, a magnetic coating material 6 was prepared by the same method as in Example 1. Measurement by the same method as in Example 1 of the dispersed particle diameter in the magnetic coating material obtained revealed it to be 50 nm. It was possible to reduce the dispersed particle diameter by extending the dispersion period.

Example 7

(1) Preparation of Surface-Modified Magnetic Particles

With the exception that the aqueous solution that was added to the water-based magnetic liquid prepared in Preparation Example 1 was changed to an aqueous solution comprised of 0.21 part of a surface-modifying agent in the form of 2,6-difluorobenzoic acid, 4.1 parts of water, and 0.05 part of sodium hydroxide, magnetic powder 7 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 7 obtained above, a magnetic coating material 7 was prepared by the same method as in Example 1. Measurement by the same method as in Example 1 of the dispersed particle diameter in the magnetic coating material obtained revealed it to be 43 nm. It was possible to reduce the dispersed particle diameter by extending the dispersion period.

Example 8

(1) Preparation of Surface-Modified Magnetic Particles

With the exception that the aqueous solution that was added to the water-based magnetic liquid prepared in Preparation Example 1 was changed to an aqueous solution comprised of 0.26 part of a surface-modifying agent in the form of 2-trifluoromethyl benzoic acid, 4.9 parts of water, and 0.05 part of sodium hydroxide, magnetic powder 8 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 8 obtained above, a magnetic coating material 8 was prepared by the same method as in Example 1. Measurement by the same method as in Example 1 of the dispersed particle diameter in the magnetic coating material obtained revealed it to be 56 nm. When the dispersion period was extended to 20 minutes, a dispersed particle diameter of 40 nm was obtained.

Example 9

(1) Preparation of Surface-Modified Magnetic Particles

With the exception that the aqueous solution that was added to the water-based magnetic liquid prepared in Preparation Example 1 was changed to an aqueous solution comprised of 0.14 part of a surface-modifying agent in the form of 2-hydroxyisobutyric acid, 2.7 parts of water, and 0.05 part of sodium hydroxide, magnetic powder 9 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 9 obtained above, a magnetic coating material 9 was prepared by the same method as in Example 1. Measurement by the same method as in Example 1 of the dispersed particle diameter in the magnetic coating material obtained revealed it to be 57 nm. When the dispersion period was extended to 15 minutes, a dispersed particle diameter of 46 nm was obtained.

Example 10

(1) Preparation of Surface-Modified Magnetic Particles

With the exception that the aqueous solution that was added to the water-based magnetic liquid prepared in Preparation Example 1 was changed to an aqueous solution comprised of 0.19 part of a surface-modifying agent in the form of 2-fluorobenzoic acid, 3.6 parts of water, and 0.05 part of sodium hydroxide, magnetic powder 10 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 10 obtained above, a magnetic coating material 10 was prepared by the same method as in Example 1. Measurement by the same method as in Example 1 of the dispersed particle diameter in the magnetic coating material obtained revealed it to be 47 nm. It was possible to reduce the dispersed particle diameter by extending the dispersion period.

Example 11

(1) Preparation of Surface-Modified Magnetic Particles

With the exception that the aqueous solution that was added to the water-based magnetic liquid prepared in Preparation Example 1 was changed to an aqueous solution comprised of 0.31 part of a surface-modifying agent in the form of 2-benzoylbenzoic acid, 5.8 parts of water, and 0.05 part of sodium hydroxide, magnetic powder 11 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 11 obtained above, a magnetic coating material 11 was prepared by the same method as in Example 1. Measurement by the same method as in Example 1 of the dispersed particle diameter in the magnetic coating material obtained revealed it to be 51 nm. When the dispersion period was extended to 26 minutes, a dispersed particle diameter of 46 nm was obtained.

Example 12

(1) Preparation of Surface-Modified Magnetic Particles

With the exception that the aqueous solution that was added to the water-based magnetic liquid prepared in Preparation Example 1 was changed to an aqueous solution comprised of 0.20 part of a surface-modifying agent in the form of 3-phenylpropionic acid, 3.9 parts of water, and 0.05 part of sodium hydroxide, magnetic powder 12 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 12 obtained above, a magnetic coating material 12 was prepared by the same method as in Example 1. Measurement by the same method as in Example 1 of the dispersed particle diameter in the magnetic coating material obtained revealed it to be 47 nm. It was possible to reduce the dispersed particle diameter by extending the dispersion period.

Example 13

(1) Preparation of Surface-Modified Magnetic Particles

With the exception that the aqueous solution that was added to the water-based magnetic liquid prepared in Preparation Example 1 was changed to an aqueous solution comprised of 0.19 part of a surface-modifying agent in the form of 3-fluorobenzoic acid, 3.6 parts of water, and 0.05 part of sodium hydroxide, magnetic powder 13 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 13 obtained above, a magnetic coating material 13 was prepared by the same method as in Example 1. Measurement by the same method as in Example 1 of the dispersed particle diameter in the magnetic coating material obtained revealed it to be 53 nm. When the dispersion period was extended to 14 minutes, a dispersed particle diameter of 37 nm was obtained.

Example 14

(1) Preparation of Surface-Modified Magnetic Particles

With the exception that the aqueous solution that was added to the water-based magnetic liquid prepared in Preparation Example 1 was changed to an aqueous solution comprised of 0.24 part of a surface-modifying agent in the form of 5-phenylvaleric acid, 4.6 parts of water, and 0.05 part of sodium hydroxide, magnetic powder 14 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 14 obtained above, a magnetic coating material 14 was prepared by the same method as in Example 1. Measurement by the same method as in Example 1 of the dispersed particle diameter in the magnetic coating material obtained revealed it to be 50 nm. It was possible to reduce the dispersed particle diameter by extending the dispersion period.

Example 15

(1) Preparation of Surface-Modified Magnetic Particles

With the exception that the aqueous solution that was added to the water-based magnetic liquid prepared in Preparation Example 1 was changed to an aqueous solution comprised of 0.22 part of a surface-modifying agent in the form of bishydroxyethyl glycine, 4.2 parts of water, and 0.05 part of sodium hydroxide, magnetic powder 15 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 15 obtained above, a magnetic coating material 16 was prepared by the same method as in Example 1. Measurement by the same method as in Example 1 of the dispersed particle diameter in the magnetic coating material obtained revealed it to be 32 nm. It was possible to reduce the dispersed particle diameter by extending the dispersion period.

Example 16

(1) Preparation of Surface-Modified Magnetic Particles

With the exception that the aqueous solution that was added to the water-based magnetic liquid prepared in Preparation Example 1 was changed to an aqueous solution comprised of 0.21 part of a surface-modifying agent in the form of DL-mandelic acid, 3.9 parts of water, and 0.05 part of sodium hydroxide, magnetic powder 16 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 16 obtained above, a magnetic coating material 16 was prepared by the same method as in Example 1. Measurement by the same method as in Example 1 of the dispersed particle diameter in the magnetic coating material obtained revealed it to be 35 nm. It was possible to reduce the dispersed particle diameter by extending the dispersion period.

Example 17

(1) Preparation of Surface-Modified Magnetic Particles

With the exception that the aqueous solution that was added to the water-based magnetic liquid prepared in Preparation Example 1 was changed to an aqueous solution comprised of 0.23 part of a surface-modifying agent in the form of N-(4-hydroxyphenyl)glycine, 4.3 parts of water, and 0.05 part of sodium hydroxide, magnetic powder 17 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 17 obtained above, a magnetic coating material 17 was prepared by the same method as in Example 1. Measurement by the same method as in Example 1 of the dispersed particle diameter in the magnetic coating material obtained revealed it to be 39 nm. It was possible to reduce the dispersed particle diameter by extending the dispersion period.

Example 18

(1) Preparation of Surface-Modified Magnetic Particles

With the exception that the aqueous solution that was added to the water-based magnetic liquid prepared in Preparation Example 1 was changed to an aqueous solution comprised of 0.16 part of a surface-modifying agent in the form of N-acetylglycine, 3.0 parts of water, and 0.05 part of sodium hydroxide, magnetic powder 18 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 18 obtained above, a magnetic coating material 18 was prepared by the same method as in Example 1. Measurement by the same method as in Example 1 of the dispersed particle diameter in the magnetic coating material obtained revealed it to be 35 nm. It was possible to reduce the dispersed particle diameter by extending the dispersion period.

Example 19

(1) Preparation of Surface-Modified Magnetic Particles

With the exception that the aqueous solution that was added to the water-based magnetic liquid prepared in Preparation Example 1 was changed to an aqueous solution comprised of 0.26 part of a surface-modifying agent in the form of citric acid, 4.9 parts of water, and 0.05 part of sodium hydroxide, magnetic powder 19 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 19 obtained above, a magnetic coating material 19 was prepared by the same method as in Example 1. Measurement by the same method as in Example 1 of the dispersed particle diameter in the magnetic coating material obtained revealed it to be 55 nm. When the dispersion period was extended to 23 minutes, a dispersed particle diameter of 42 nm was obtained.

Example 20

(1) Preparation of Surface-Modified Magnetic Particles

With the exception that the aqueous solution that was added to the water-based magnetic liquid prepared in Preparation Example 1 was changed to an aqueous solution comprised of 0.29 part of a surface-modifying agent in the form of sodium gluconate and 5.6 parts of water, magnetic powder 20 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 20 obtained above, a magnetic coating material 20 was prepared by the same method as in Example 1. Measurement by the same method as in Example 1 of the dispersed particle diameter in the magnetic coating material obtained revealed it to be 50 nm. When the dispersion period was extended to 30 minutes, a dispersed particle diameter of 38 nm was obtained.

Example 21

(1) Preparation of Surface-Modified Magnetic Particles

With the exception that the aqueous solution that was added to the water-based magnetic liquid prepared in Preparation Example 1 was changed to an aqueous solution comprised of 0.12 part of a surface-modifying agent in the form of crotonic acid, 2.2 parts of water, and 0.05 part of sodium hydroxide, magnetic powder 21 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 21 obtained above, a magnetic coating material 22 was prepared by the same method as in Example 1. Measurement by the same method as in Example 1 of the dispersed particle diameter in the magnetic coating material obtained revealed it to be 37 nm. It was possible to reduce the dispersed particle diameter by extending the dispersion period.

Example 22

(1) Preparation of Surface-Modified Magnetic Particles

With the exception that the aqueous solution that was added to the water-based magnetic liquid prepared in Preparation Example 1 was changed to an aqueous solution comprised of 0.16 part of a surface-modifying agent in the form of succinic acid, 3.0 parts of water, and 0.05 part of sodium hydroxide, magnetic powder 22 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 22 obtained above, a magnetic coating material 22 was prepared by the same method as in Example 1. Measurement by the same method as in Example 1 of the dispersed particle diameter in the magnetic coating material obtained revealed it to be 50 nm. When the dispersion period was extended to 12 minutes, a dispersed particle diameter of 44 nm was obtained.

Example 23

(1) Preparation of Surface-Modified Magnetic Particles

With the exception that the aqueous solution that was added to the water-based magnetic liquid prepared in Preparation Example 1 was changed to an aqueous solution comprised of 0.19 part of a surface-modifying agent in the form of salicylic acid, 3.5 parts of water, and 0.05 part of sodium hydroxide, magnetic powder 23 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 23 obtained above, a magnetic coating material 23 was prepared by the same method as in Example 1. Measurement by the same method as in Example 1 of the dispersed particle diameter in the magnetic coating material obtained revealed it to be 49 nm. When the dispersion period was extended to 12 minutes, a dispersed particle diameter of 43 nm was obtained.

Example 24

(1) Preparation of Surface-Modified Magnetic Particles

With the exception that the aqueous solution that was added to the water-based magnetic liquid prepared in Preparation Example 1 was changed to an aqueous solution comprised of 0.22 part of a surface-modifying agent in the form of orthophthalic acid, 4.3 parts of water, and 0.05 part of sodium hydroxide, magnetic powder 24 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 24 obtained above, a magnetic coating material 24 was prepared by the same method as in Example 1. Measurement by the same method as in Example 1 of the dispersed particle diameter in the magnetic coating material obtained revealed it to be 50 nm. When the dispersion period was extended to 30 minutes, a dispersed particle diameter of 30 nm was obtained.

Example 25

(1) Preparation of Surface-Modified Magnetic Particles

With the exception that the aqueous solution that was added to the water-based magnetic liquid prepared in Preparation Example 1 was changed to an aqueous solution comprised of 0.18 part of a surface-modifying agent in the form of cyclohexanecarboxylic acid and 4.3 parts of water, magnetic powder 25 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 25 obtained above, a magnetic coating material 25 was prepared by the same method as in Example 1. Measurement by the same method as in Example 1 of the dispersed particle diameter in the magnetic coating material obtained revealed it to be 45 nm. When the dispersion period was extended from 10 minutes to 40 minutes, a dispersed particle diameter of 36 nm was obtained.

Example 26

(1) Preparation of Surface-Modified Magnetic Particles

With the exception that the aqueous solution that was added to the water-based magnetic liquid prepared in Preparation Example 1 was changed to an aqueous solution comprised of 0.21 part of a surface-modifying agent in the form of tartaric acid and 4.3 parts of water, magnetic powder 26 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 26 obtained above, a magnetic coating material 26 was prepared by the same method as in Example 1. Measurement by the same method as in Example 1 of the dispersed particle diameter in the magnetic coating material obtained revealed it to be 58 nm. When the dispersion period was extended from 10 minutes to 30 minutes, a dispersed particle diameter of 39 nm was obtained.

Example 27

(1) Preparation of Surface-Modified Magnetic Particles

With the exception that the aqueous solution that was added to the water-based magnetic liquid prepared in Preparation Example 1 was changed to an aqueous solution comprised of 0.29 part of a surface-modifying agent in the form of trimellitic acid and 4.3 parts of water, magnetic powder 27 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 27 obtained above, a magnetic coating material 27 was prepared by the same method as in Example 1. Measurement by the same method as in Example 1 of the dispersed particle diameter in the magnetic coating material obtained revealed it to be 55 nm. When the dispersion period was extended from 10 minutes to 30 minutes, a dispersed particle diameter of 38 nm was obtained.

Example 28

(1) Preparation of Surface-Modified Magnetic Particles

With the exception that the aqueous solution that was added to the water-based magnetic liquid prepared in Preparation Example 1 was changed to an aqueous solution comprised of 0.23 part of a surface-modifying agent in the form of phenylalanine and 4.3 parts of water, magnetic powder 28 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 28 obtained above, a magnetic coating material 28 was prepared by the same method as in Example 1. Measurement by the same method as in Example 1 of the dispersed particle diameter in the magnetic coating material obtained revealed it to be 52 nm. When the dispersion period was extended from 10 minutes to 30 minutes, a dispersed particle diameter of 45 nm was obtained.

Example 29

(1) Preparation of Surface-Modified Magnetic Particles

With the exception that the aqueous solution that was added to the water-based magnetic liquid prepared in Preparation Example 1 was changed to an aqueous solution comprised of 0.31 part of a surface-modifying agent in the form of 5-tert-butylisophthalic acid, 4.3 parts of water, and 0.06 part of sodium hydroxide, magnetic powder 29 was prepared by the same method as in Example 1. Differential thermal analysis conducted by the same method as in Example 1 confirmed a reduction in weight over the volatilization temperature range of 250° C. to 500° C. of the surface-modifying agent employed in the present Example, thereby confirming that the surface-modifying agent had adsorbed to the surface of the magnetic particles.

(2) Preparation of Magnetic Coating Material

With the exception that the magnetic powder employed was changed to 1.0 part of magnetic powder 29 obtained above, a magnetic coating material 29 was prepared by the same method as in Example 1. Measurement by the same method as in Example 1 of the dispersed particle diameter in the magnetic coating material obtained revealed it to be 33 nm.

Comparative Example 1

With the exception that the magnetic powder employed was changed from magnetic powder 1 to 1.0 part of the barium ferrite magnetic particles employed as starting material magnetic powder in Preparation Example 1, comparative magnetic coating material 1 was prepared by the same method as in Example 1. Measurement by the same method as in Example 1 of the dispersed particle diameter in the magnetic coating material obtained revealed it to be 78 nm. When the dispersion period was extended from 10 minutes, a dispersed particle diameter of 60 nm was obtained at 20 minutes. Immediately thereafter, reaggregation occurred due to overdispersion, and a dispersed particle diameter of equal to or more than 100 nm was obtained. Subsequently, it became impossible to obtain a dispersed particle diameter of equal to or less than 60 nm.

By contrast, in Examples set forth above, the longer the period of dispersion, the smaller the dispersed particle diameter that was obtained. Thus, the surface-modifying agent was determined to have the effect of inhibiting the occurrence of overdispersion.

Since the starting material magnetic powder employed in Comparative Example 1 did not exhibit a reduction in weight over the temperature range of 250° C. to 500° C. when subjected to differential thermal analysis by the same method as in Example 1, the reduction in weight observed in the Examples was determined to have been due to volatilization of the surface-modifying agent adhered to the magnetic particles.

Comparative Example 2

(1) Preparation of Surface-Modified Magnetic Particles

With the exception that the aqueous solution that was added to the water-based magnetic liquid prepared in Preparation Example 1 was changed to an aqueous solution comprised of 0.38 part of a surface-modifying agent in the form of oleic acid, 7.2 parts of water, and 0.05 part of sodium hydroxide, comparative magnetic powder 2 was prepared by the same method as in Example 1. Differential thermal analysis conducted by the same method as in Example 1 confirmed a reduction in weight over the volatilization temperature range of 250° C. to 500° C. of oleic acid, thereby confirming that the oleic acid had adsorbed to the surface of the magnetic powder.

(2) Preparation of Magnetic Coating Material

With the exception that the magnetic powder employed was changed to 1.0 part of comparative magnetic powder 2 obtained above, a comparative magnetic coating material 2 was prepared by the same method as in Example 1. Measurement by the same method as in Example 1 of the dispersed particle diameter in the magnetic coating material obtained revealed it to be equal to or greater than 100 nm.

For comparison, the dispersed particle diameters measured for a dispersion period of 10 minutes in Examples 1 to 29 and Comparative Examples 1 and 2 are given in Table 1 below.

TABLE 1

| | Surface-modifying agent | Dispersed particle diameter for 10 minute dispersion period |
|---|---|---|
| Example 1 | Trans-aconitic acid | 49 nm |
| Example 2 | Aspartic acid | 49 nm |
| Example 3 | DL-alanine | 45 nm |
| Example 4 | Benzoic acid | 53 nm |
| Example 5 | Isophthalic acid | 50 nm |
| Example 6 | Trans-cinnamic acid | 50 nm |
| Example 7 | 2,6-Difluorobenzoic acid | 43 nm |
| Example 8 | 2-Trifluoromethyl benzoic acid | 56 nm |
| Example 9 | 2-Hydroxyisobutyric acid | 57 nm |
| Example 10 | 2-Fluorobenzoic acid | 47 nm |
| Example 11 | 2-Benzoylbenzoic acid | 51 nm |
| Example 12 | 3-Phenylpropionic acid | 47 nm |
| Example 13 | 3-Fluorobenzoic acid | 53 nm |
| Example 14 | 5-Phenylvaleric acid | 50 nm |
| Example 15 | Bishydroxyethyl glycine | 32 nm |
| Example 16 | DL-mandelic acid | 35 nm |
| Example 17 | N-(4-hydroxyphenyl)glycine | 39 nm |
| Example 18 | N-acetylglycine | 35 nm |
| Example 19 | Citric acid | 55 nm |
| Example 20 | Sodium gluconate | 50 nm |
| Example 21 | Crotonic acid | 37 nm |
| Example 22 | Succinic acid | 50 nm |
| Example 23 | Salicylic acid | 49 nm |
| Example 24 | Orthophthalic acid | 50 nm |
| Example 25 | Cyclohexanecarboxylic acid | 45 nm |
| Example 26 | Tartaric acid | 58 nm |
| Example 27 | Trimellitic acid | 55 nm |
| Example 28 | Phenylalanine | 52 nm |
| Example 29 | 5-Tert-butylisophthalic acid | 33 nm |
| Comparative Example 1 | None | 78 nm |
| Comparative Example 2 | Oleic acid | 100 nm or more |

As shown in Table 1, Examples could achieve a highly dispersed state of magnetic particles in which magnetic particles exhibited smaller dispersed particle diameters than Comparative Examples. Thus, an aspect of the present invention was determined to readily provide a magnetic coating material containing magnetic particles in a highly dispersed state without the application of a high dispersion load. Using the magnetic coating material thus obtained, it was possible to form a magnetic layer in which magnetic particles were highly dispersed, thereby making it possible to obtain a magnetic recording medium affording good electromagnetic characteristics.

The present invention is useful in the field of manufacturing magnetic recording media for high-density recording, such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing magnetic particles, which comprises:
adding a carboxylic acid compound to a water-based magnetic liquid, wherein the water-based magnetic liquid comprises magnetic particles dispersed in an acidic water-based solvent, and the carboxylic acid compound comprises one or more branched alkyl groups and/or fluorine-containing substituents selected from the group consisting of fluorine atoms and alkyl groups substituted with one or more fluorine atoms and is selected from the group consisting of aromatic compounds and aliphatic compounds having one or more carboxylic acid (salt) groups denoted by:

—COOM wherein M denotes a hydrogen atom or an alkali metal atom, provided that when the number of the carboxylic acid (salt) groups contained within the molecule thereof is 1, the number of carbon atoms, excluding the carboxylic acid (salt) group portion, is equal to or more than 1 but equal to or less than 13; and then collecting the magnetic particles from the water-based magnetic liquid to obtain the magnetic particles the surfaces of which have been modified by being coated with the carboxylic acid compound.

2. The method of manufacturing magnetic particles according to claim 1, wherein the carboxylic acid compound is an aromatic compound comprising one or more substituents selected from the group consisting of the branched alkyl groups and the fluorine-containing substituents.

3. The method of manufacturing magnetic particles according to claim 2, wherein the aromatic compound comprises one or more benzene rings on which one or more substituents selected from the group consisting of the branched alkyl groups and the fluorine-containing substituents are substituted at an ortho position or a meta position of the carboxylic acid (salt) group.

4. The method of manufacturing magnetic particles according to claim 1, wherein the carboxylic acid compound is selected from the group consisting of difluorobenzoic acid, trifluoromethyl benzoic acid, hydroxyisobutyric acid, fluorobenzoic acid, and tert-butylisophthalic acid.

5. The method of manufacturing magnetic particles according to claim 1, wherein the magnetic particles are hexagonal ferrite magnetic particles.

6. A method of manufacturing magnetic particles, which comprises:

adding a carboxylic acid compound to a water-based magnetic liquid, wherein the water-based magnetic liquid comprises magnetic particles dispersed in an acidic water-based solvent, and the carboxylic acid compound is a monosubstituted nitrogen, disubstituted nitrogen, or trisubstituted nitrogen-containing compound and is selected from the group consisting of aromatic compounds and aliphatic compounds having one or more carboxylic acid (salt) groups denoted by:

—COOM wherein M denotes a hydrogen atom or an alkali metal atom, provided that when the number of the carboxylic acid (salt) groups contained within the molecule thereof is 1, the number of carbon atoms, excluding the carboxylic acid (salt) group portion, is equal to or more than 1 but equal to or less than 13; and then collecting the magnetic particles from the water-based magnetic liquid to obtain the magnetic particles the surfaces of which have been modified by being coated with the carboxylic acid compound.

7. The method of manufacturing magnetic particles according to claim 6, wherein the magnetic particles are hexagonal ferrite magnetic particles.

8. A method of manufacturing magnetic particles, which comprises:

adding a carboxylic acid compound to a water-based magnetic liquid, wherein the water-based magnetic liquid comprises magnetic particles dispersed in an acidic water-based solvent, and the carboxylic acid compound comprises one or more hydroxyl groups and is selected from the group consisting of aromatic compounds and aliphatic compounds having one or more carboxylic acid (salt) groups denoted by:

—COOM wherein M denotes a hydrogen atom or an alkali metal atom, provided that when the number of the carboxylic acid (salt) groups contained within the molecule thereof is 1, the number of carbon atoms, excluding the carboxylic acid (salt) group portion, is equal to or more than 1 but equal to or less than 13; and then collecting the magnetic particles from the water-based magnetic liquid to obtain the magnetic particles the surfaces of which have been modified by being coated with the carboxylic acid compound.

9. The method of manufacturing magnetic particles according to claim 8, wherein the magnetic particles are hexagonal ferrite magnetic particles.

10. A method of manufacturing magnetic particles, which comprises:

adding a carboxylic acid compound to a water-based magnetic liquid, wherein the water-based magnetic liquid comprises magnetic particles dispersed in an acidic water-based solvent, and the carboxylic acid compound is selected from the group consisting of aromatic compounds and aliphatic compounds having two or more carboxylic acid (salt) groups denoted by:

—COOM wherein M denotes a hydrogen atom or an alkali metal atom; and then collecting the magnetic particles from the water-based magnetic liquid to obtain the magnetic particles the surfaces of which have been modified by being coated with the carboxylic acid compound.

11. The method of manufacturing magnetic particles according to claim 10, wherein the magnetic particles are hexagonal ferrite magnetic particles.

12. Magnetic particles manufactured by the manufacturing method according to claim 1.

13. Magnetic recording magnetic powder comprised of the magnetic particles according to claim 12.

14. A magnetic coating material which comprises the magnetic particles according to claim 12 and an organic solvent.

15. The magnetic coating material according to claim 14, which further comprises a binder.

16. A coating material which is the magnetic coating material according to claim 14 and employed in forming a magnetic layer of a magnetic recording medium.

17. A method of manufacturing a magnetic recording medium, which comprises:

dispersing the magnetic particles according to claim 12 together with an organic solvent and a binder to prepare a magnetic coating material; and forming a magnetic layer with the magnetic coating material that has been prepared.

18. A magnetic recording medium manufactured by the manufacturing method according to claim 17.

* * * * *